United States Patent
Carsello

(10) Patent No.: US 7,817,733 B2
(45) Date of Patent: Oct. 19, 2010

(54) METHOD AND SYSTEM FOR PEAK POWER REDUCTION

(75) Inventor: Stephen R. Carsello, Plantation, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 586 days.

(21) Appl. No.: 11/428,310

(22) Filed: Jun. 30, 2006

(65) Prior Publication Data

US 2008/0002779 A1    Jan. 3, 2008

(51) Int. Cl.
*H04K 1/10* (2006.01)

(52) U.S. Cl. .................. 375/260; 375/259; 375/295; 375/296; 708/400; 708/405; 708/403; 708/404; 370/210; 370/478; 370/203; 370/338

(58) Field of Classification Search .............. 375/260, 375/259, 295, 296; 708/400, 405, 403, 404; 370/210, 478, 203, 338
See application file for complete search history.

(56) References Cited

U.S. PATENT DOCUMENTS

| | | | |
|---|---|---|---|
| 5,606,578 A | 2/1997 | O'Dea | |
| 5,696,794 A | 12/1997 | O'Dea | |
| 5,805,640 A | 9/1998 | O'Dea et al. | |
| 6,240,141 B1 * | 5/2001 | Long | 375/260 |
| 6,298,094 B1 | 10/2001 | Dehner et al. | |
| 6,925,128 B2 | 8/2005 | Corral | |
| 2004/0156442 A1 | 8/2004 | Clausen | |
| 2005/0008094 A1 | 1/2005 | Kramer et al. | |
| 2005/0018787 A1 * | 1/2005 | Saed | 375/296 |
| 2005/0031064 A1 * | 2/2005 | Kolze et al. | 375/350 |
| 2005/0089116 A1 | 4/2005 | Moffatt et al. | |
| 2005/0259565 A1 * | 11/2005 | Fujii et al. | 370/203 |
| 2005/0270968 A1 | 12/2005 | Feng et al. | |
| 2006/0140296 A1 * | 6/2006 | Cleveland et al. | 375/260 |
| 2007/0116142 A1 * | 5/2007 | Molander | 375/260 |
| 2008/0043616 A1 * | 2/2008 | Clausen et al. | 370/210 |
| 2008/0043626 A1 * | 2/2008 | Pham et al. | 370/241 |

OTHER PUBLICATIONS

Stefan Muller, Johannes Huber, "A Novel Peak Power Reduction Scheme for OFDM", Personal Indoor and Mobile Radio Communications 1997, in Helsinki, Sept, 3, 1997, Universität Erlanen-Nürnberg.

Himket Sari, "Sequans Communications for Next Generation Broadband Wireless Access", 4th Annual Wireless Broadband Forum, 21-page article, http://www.sequans.com/siteimages/4th_WBF.pdf, website last visited Jun. 30, 2006.

Patent Cooperation Treaty, "International Search Report and Written Opinion" ISA/US, Authorized Office Chien Fan; 9 pages, Mar. 21, 2008.

* cited by examiner

*Primary Examiner*—Chieh M Fan
*Assistant Examiner*—Siu M Lee

(57) ABSTRACT

A system (100) and method (400) for peak limiting suitable for use in a communication system is provided. The method can include modulating (402) a symbol vector to produce a modulated waveform (500), wherein the symbol vector contains at least one symbol in at least one subcarrier (130), computing (404) at least one symbol adjustment that is based on at least one peak overshoot (512) of the modulated waveform, and applying (406) the at least one symbol adjustment to the symbol vector in accordance with an assigned weighting for reducing a peak power of the modulated waveform. The method limits an energy in the at least one subcarrier to a prespecified level of distortion.

16 Claims, 6 Drawing Sheets

550

FROM 404
↓
| Detect at least one peak in the modulated waveform that exceeds a threshold. | — 602 |
↓
| Compute at least one peak overshoot for the at least one peak. | — 604 |
↓
| Determine an angle and a magnitude of the at least one peak overshoot. | — 606 |
↓
| Generate at least one symbol adjustment from the at least one peak overshoot. | — 608 |
↓
TO 406

METHOD AND SYSTEM FOR PEAK POWER REDUCTION

FIELD OF THE INVENTION

The present invention relates to wireless communication systems and, more particularly, to methods for peak power reduction.

BACKGROUND

The use of portable electronic devices and mobile communication devices has increased dramatically in recent years. Mobile communication devices such as cell phones operate over wireless communication systems using a variety of communication protocols. Orthogonal Frequency Division Multiplexing (OFDM) is a well-known, multi-carrier data transmission technique, used in wireless communications for achieving high throughput over a time-dispersive radio channel, without the need for a channel equalizer in the receiver. However, OFDM requires a high peak-to-average power ratio (PAPR) in the transmitter. A transmitter sending the OFDM mobile communication signal can either drive a power amplifier (PA) into saturation, thereby generating a large amount of splatter, or, reduce the average transmitted power. Consequently, PA efficiency and link margin may be sacrificed. Splatter refers to, either, spectral leakage across one or more in-band OFDM subcarriers, or, spectral leakage outside of the designated OFDM band. Accordingly, FCC regulations limit excessive out-of-band splatter, while system operators must ensure that in-band splatter is controlled to acceptable levels. A need therefore exists for a peak power reduction scheme, which controls the splatter in a desirable way, such that the PA may be driven more efficiently while preserving link margin.

SUMMARY

Broadly stated, the invention is directed to a method system for peak power reduction in a mobile communication system. One embodiment of the invention is a method for peak limiting. The method can include an iterative process for modulating a symbol vector to produce a modulated waveform, computing at least one symbol adjustment based on at least one peak overshoot of the modulated waveform, and distributing the at least one symbol adjustment across at least one subcarrier for introducing a prespecified level of distortion in the at least one subcarrier. Upon distributing the at least one symbol adjustment across the symbol vector, the symbol vector can be re-modulated in an iterative process to produce an updated modulated waveform. The process of modulating a symbol vector, distributing the symbol adjustment, and re-modulating can be repeated until one or more subcarriers provide a predetermined distortion.

The method controls a distribution of distortion energy across one or more subcarriers in the iterative manner based on a weighting factor, wherein the distortion energy is steered to subcarriers in response to the at least one symbol adjustment. The method can include assigning at least one weight to the at least one symbol adjustment, wherein the at least one weight corresponds to a prespecified level of distortion in a subcarrier. The method can be implemented as an efficient iterative process that applies an update factor to the symbol adjustments. Moreover, the method can reserve one or more subcarriers to control distortion in non-reserved subcarriers. The distortion energy can be steered towards one or more reserved subcarriers to increase power amplifier efficiency and link margin.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

Figure 1:
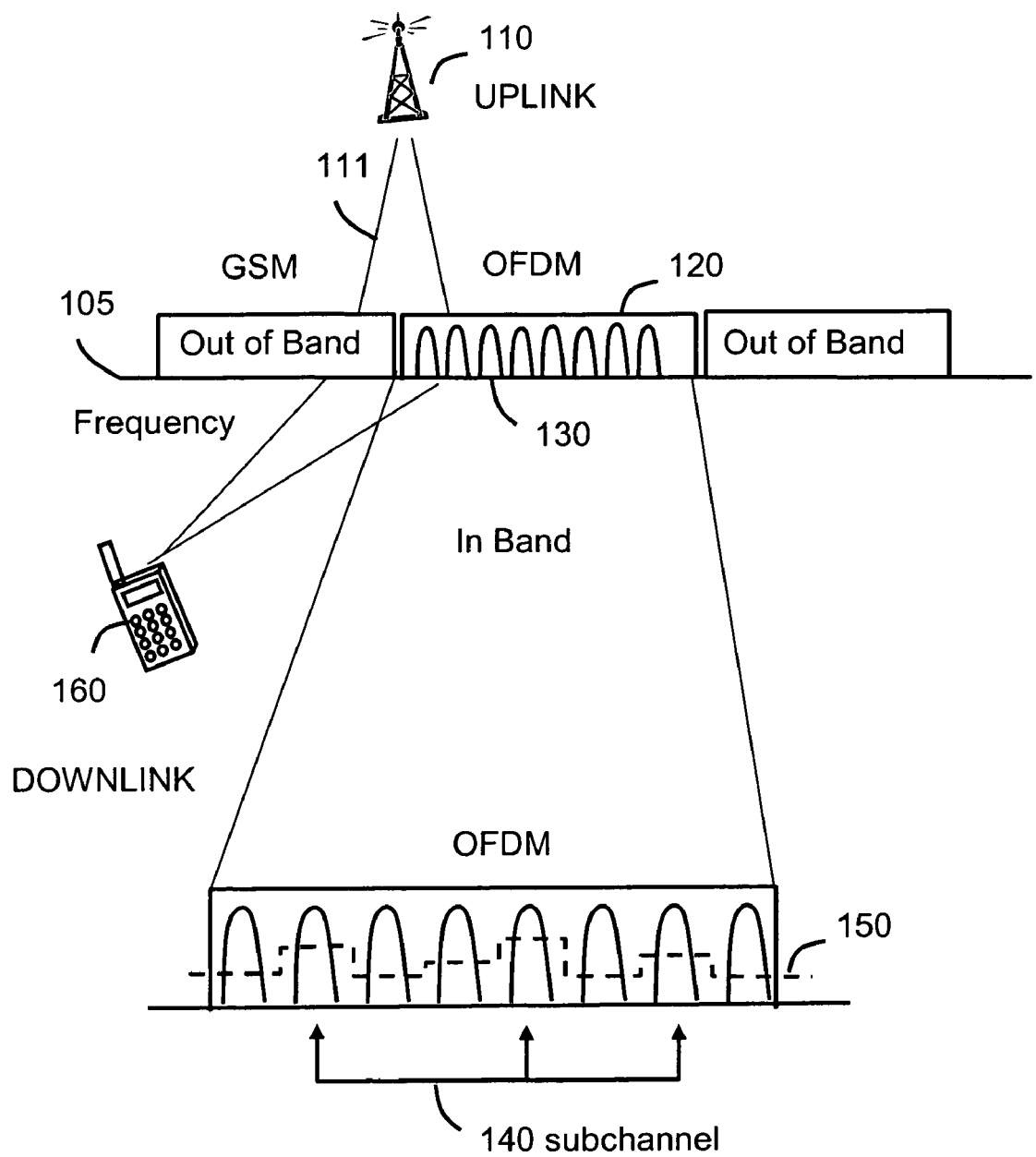
FIG. 1 is a mobile communication environment in accordance with the embodiments of the invention.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely. The term "processing" can be defined as number of suitable processors, controllers, units, or the like that carry out a pre-programmed or programmed set of instructions.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Embodiments of the invention are directed to a method and system for reducing a peak power of a digital communication signal. In particular, an efficient and iterative process is presented for peak limiting, which allows splatter to be controlled in a flexible manner. The system can control a peak-to-average power ratio (PAPR) of a modulated waveform containing at least one symbol in at least one subcarrier by distributing one or more symbol adjustments across one or more subcarriers. The system can inject a prespecified level of distortion in the one or more subcarriers to control peak limiting in the digital communication signal.

Referring to FIG. 1, a mobile communication environment 100 for providing wireless connectivity is shown. The mobile communication environment 100 can include at least one base station 110 and at least one mobile subscriber 160. In one arrangement, the mobile device 160 can communicate with the base receiver 110 using a physical layer such as Orthogonal Frequency Division Multiplexing (OFDM). OFDMA achieves high throughput over a time-dispersive radio channel, without the need for a channel equalizer in a receiver of the mobile device 160. Understandably, more than one base station 110 and more than one mobile device 160 can be included in the mobile communication environment 100. The mobile device 160 and the base receiver 110 can also communicate over CDMA, GSM, or iDEN, and are not limited to OFDM.

Briefly referring to FIG. 1, the frequency spectrum 105 can be divided into a plurality of bands for allowing data communication. For example, the frequency spectrum 105 can have an OFDM band 120, a GSM band, and/or other bands. In OFDMA systems, such as 802.16e, a communication uplink 111 can be multiplexed into a subchannel 140, where one or more subcarriers 130 within a subchannel are dispersed throughout the OFDM bandwidth 120. The OFDM band 120 can support multiple subcarriers 130 which can each provide a traffic channel for data communication. When referring to OFDM communication, bands outside the OFDM band 120, such as GSM, are out-of-band. Subcarriers 130 within the OFDM band 120 are in-band with respect to OFDM communication.

One or more subcarriers 130 can be grouped together to form a sub-channel 140, and there can be multiple subchannels within the OFDM band 120. Notably, the subcarriers of one user can interleave with the subcarriers of other subchannels. Consequently, over a given symbol interval, distortion from one subchannel can spill into subcarriers of another subchannel. This can distort the signal information in the other subchannels, thereby deteriorating the signal quality and reception of the other subchannels' digital communication signal.

Figure 2:
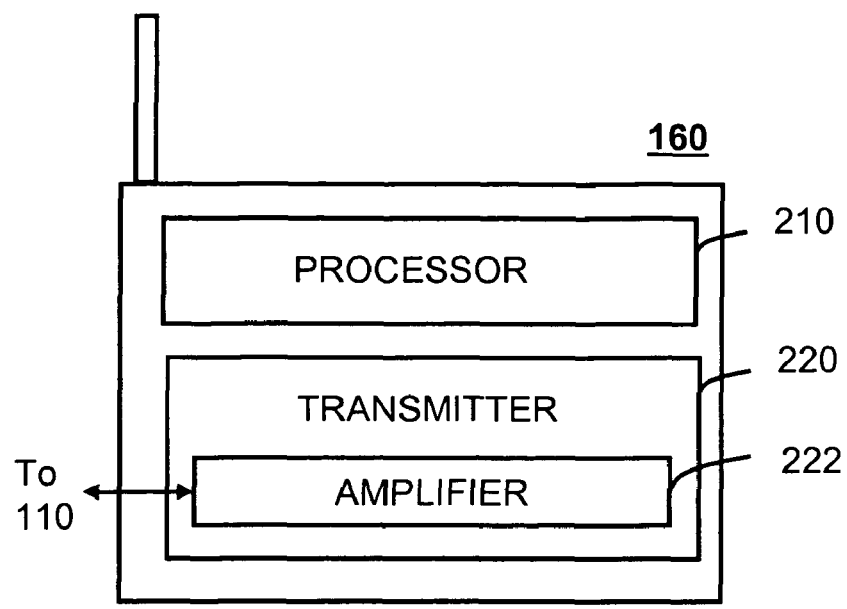
FIG. 2 is a block diagram of a mobile device in accordance with the embodiments of the invention.

Referring to FIG. 2, the mobile device 160 is shown in greater detail. The mobile device 160 can include a processor 210 for generating a waveform, such as an OFDMA waveform, and a transmitter 220 for sending the waveform to the base receiver 110, or any other suitable receiving communication system. In particular, the processor 210 can generate the modulated waveform from a symbol vector having one or more complex symbols. The processor 210 can modulate the symbol vector over a given symbol interval to produce the modulated waveform. The transmitter 220 can also include a power amplifier 222 for increasing a signal level of the modulated waveform to the base station 110.

In general, envelope variations of an OFDM waveform can approximate a Rayleigh distribution with peak-to-average power ratios (PAPRs) in excess of 10 dB. Accordingly, in order to support the high PAPR of OFDM waveforms, the transmitter 220 generally sends the OFDM waveform by either driving the power amplifier (PA) 222 into saturation, or reducing the average transmitted power of the PA 222. Understandably, the PA 222 may not be linear within a region of operation for the OFDM waveforms. For example, a non-linear characteristic of the PA 222 may suppress high input signals, such as the peaks of an OFDM waveform. The suppressing may introduce harmonic distortion or spectral leakage into one or more subcarriers of the OFDM waveform, in addition to out-of-band splatter. Accordingly, driving the PA into saturation can splatter energy across one or more subcarriers in the OFDM band thereby distorting the information carried by the subcarriers.

Figure 3:
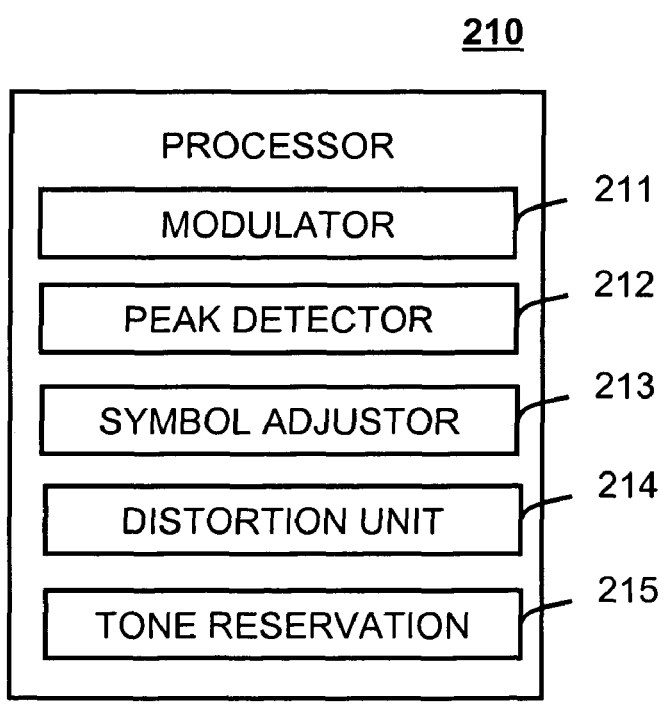
FIG. 3 is a more detailed block diagram of the mobile device of FIG. 2 in accordance with the embodiments of the invention.

One embodiment of the invention is directed to a peak power reduction system for limiting, not only, out-of-band splatter, but also, in-band splatter into the subcarriers occupied by other users sharing the same subchannel. Referring to FIG. 3, the processor 210 of FIG. 2 for providing peak power reduction is shown in accordance with one embodiment of the invention. In particular, the processor 210 can control a peak-to-average power ratio (PAPR) of the OFDM waveform by distributing at least one modulated symbol adjustment across one or more subcarriers (130) for introducing a prespecified level of distortion in the one or more subcarriers (130). That is, the processor 210 can control a distortion energy in the at least one subcarrier for reducing a splatter of energy due to the PA 222 saturation to increase transmit efficiency and link margin.

The processor 210 can include a modulator 211 for modulating a symbol vector to produce an modulated waveform, such as an OFDM waveform, a peak detector 212 for computing at least one peak overshoot in the waveform, and a symbol adjustor 213 for generating at least one symbol vector adjustment from the at least one peak overshoot. The peak detector 212 can identify at least one peak in the modulated waveform that exceeds a threshold. The peak detector 212 can also compute at least one peak overshoot for the at least one peak, and determine an angle and a magnitude of the at least one peak overshoot. The symbol adjuster 213 can generate at least one symbol vector adjustment from the at least one peak overshoot.

The processor 210 can further include a distortion unit 214 for assigning at least one weight to the at least one subcarrier, wherein the at least one weight corresponds to the prespecified level of distortion in the at least one subcarrier. For example, briefly referring back to FIG. 1, a distortion threshold 150 can be determined for the one or more subcarriers 130 within the OFDM band 120, or outside of the OFDM band. In one arrangement, the distortion threshold 150 can be established prior to data communication between the base station 110 and the mobile device 160. The distortion threshold 150 may be fixed or adaptive. The distortion threshold 150 can be used to determine a weighting associated for the one or more subcarriers. For instance, each subcarrier 130 can be assigned a weighting that describes a level of distortion that is tolerable for maintaining a signal quality level of the subcarrier 130.

The processor 210 can further include a tone reservation unit 215 for reserving at least one subcarrier to provide a reserved subcarrier. A reserved carrier is a subcarrier that is empty; that is, it is not presently being used for data communication. The processor 210 can dump energy into the reserved subcarrier for controlling the symbol adjustment across the subcarriers of the OFDM waveform. That is, the processor 210 can distribute energy that is produced (i.e. splattered) in response to the at least one symbol adjustment into one or more reserved carriers for limiting the amount of splatter to occupied subchannels. Notably, the processor 210 attempts to distribute splatter across one or more subcarriers in accordance with a weighting assigned to each subcarrier.

Figure 4:
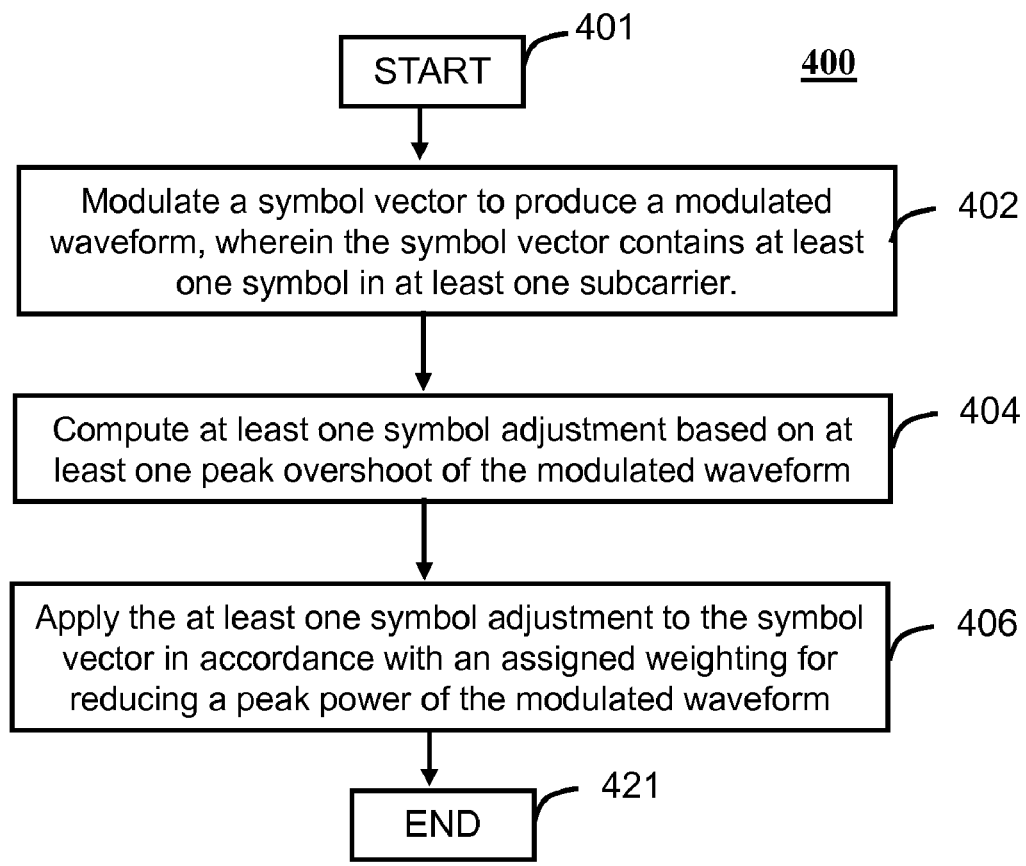
FIG. 4 is a method for peak limiting in accordance with the embodiments of the invention.

Referring to FIG. 4, a method 400 for peak limiting suitable for use in the mobile communication 100 system is shown. The method 400 can be practiced with more or less than the number of steps shown. To describe the method 400, reference will be made to FIGS. 3, 5, and 6 although it is understood that the method 400 can be implemented in any other suitable device or system using other suitable components. Moreover, the method 400 is not limited to the order in which the steps are listed in the method 400. In addition, the method 400 can contain a greater or a fewer number of steps than those shown in FIG. 4.

At step 401, the method for peak limiting a modulated waveform can start. The method 400 can start in a state wherein a symbol vector has been generated from an information signal. The symbol vector may contain at least one symbol carried by at least one subcarrier. The symbol vector may be a frequency-domain symbol vector wherein the symbols are represented in complex notation, and each symbol can correspond to a subcarrier. For example, symbols of the frequency-domain symbol vector can be plotted in a constellation plot for identifying one or more subcarriers of the information signal. The frequency-domain symbol vector may be written as:

$$X = [X_0 \, X_1 \ldots X_{N-1}] \quad \text{EQ 1}$$

The frequency-domain symbol vector, $X$, can be modulated over a given OFDM symbol interval, where N is the number of subcarriers used for OFDM modulation. The number of used subcarriers can be denoted by $N_u$, so that $X$ contains $N-N_u$ zeros. Used subcarriers carry information such as data for supporting a voice call.

The method 400 can also start in a state wherein a frequency-domain weight vector has been determined, and which describes a tolerable level of distortion for each subcarrier. The frequency-domain weight vector can be written as:

$$W = [W_0 \, W_1 \ldots W_{N-1}] \quad \text{EQ 2}$$

That is, the frequency-domain weight vector specifies how much distortion can be added to each subcarrier while still maintaining a tolerable (i.e. predetermined) signal quality level. The frequency-domain weight has the property:

$$\sum_{k=0}^{N-1} W_k = \sqrt{N_u} \quad \text{EQ 3}$$

At step 402, the symbol vector can be modulated to produce a modulated waveform. For example, the frequency-domain symbol vector, $X$, of EQ 1 can represent an OFDM waveform that can be modulated using an inverse Fast Fourier transform (IFFT) to produce a modulated waveform, $X_n$:

$$x_n = \frac{1}{\sqrt{N_u}} \sum_{k=0}^{N-1} X_k e^{j2\pi kn/N} \quad \text{EQ 4}$$

for $$0 \leq n \leq N-1$$

Under an assumption that the average power of the symbols appearing on the used subcarriers is unity, then the average power of the modulated waveform $$\vec{x} = [x_0 \, x_1 \ldots x_{N-1}] \quad \text{EQ 5}$$

will also be unity. Understandably, in accordance with time-frequency properties of the IFFT, the modulated waveform $\vec{x}$ can be considered a time-domain waveform when the information signal is a frequency-domain waveform.

At step 404, at least one symbol vector adjustment can be computed based on at least one peak overshoot of the modulated waveform, $\vec{x}$. For example, referring to FIG. 5, a modulated waveform 500, corresponding to $\vec{x}$ of EQ 4, is shown. The modulated waveform 500 is presented merely for illustrating peak threshold detection and peak overshoot determination and is not an actual modulated waveform. The modulated waveform 500 can have one or more peaks in the modulated waveform that exceed a threshold 510. Understandably, only two peaks are shown for illustration, and more than two may be observed in practice. Moreover, the time-domain peak overshoot vector can be formed with zero values at time instances where the peak overshoot does not occur, and non-zero, complex values at times where peak overshoot does occur. The complex values represent the magnitude of the overshoot and angle of the corresponding modulated sample.

Briefly referring back to FIG. 3, the peak detector 212 can identify the one or more peaks in the modulated waveform 500 and determine the peak overshoots corresponding to the one or more peaks. Understandably, the peaks in the modulated waveform 500 can drive the Power Amplifier 222 (See FIG. 3) into saturation thereby splattering energy into one or more subcarriers occupied by other OFDM users, or into out-of-band frequencies, as previously discussed. Accordingly, a power of one or more peaks in the modulated waveform can be reduced by distributing the splatter to one or more subcarriers in a controlled manner in accordance with an embodiment of the invention.

Figures 5, 6:
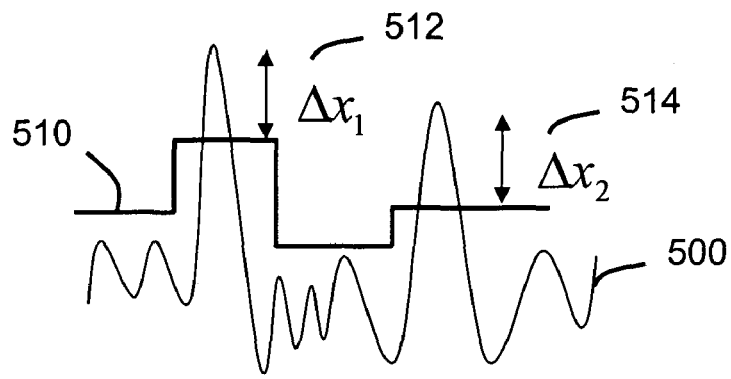
FIG. 5 is an illustration of a modulated waveform in accordance with the embodiments of the invention.
FIG. 6 is a method generating a symbol adjustment in accordance with the embodiments of the invention.

Referring to FIG. 6, an exemplary method 600 for generating at least one symbol adjustment based on at least one peak overshoot is shown. The method 600 can also be practiced with more or less than the number of steps shown. To describe the method 600, reference will be made to FIG. 5 although it is understood that the method 600 can be implemented in any other suitable device or system using other suitable components. Moreover, the method 600 is not limited to the order in which the steps are listed in the method 600. In addition, the method 600 can contain a greater or a fewer number of steps than those shown in FIG. 6.

At step 602, at least one peak that exceeds a threshold in the modulated waveform can be detected. For example, referring back to FIG. 5, the modulated waveform 500 can be compared to the threshold 510. At step 604, at least one peak overshoot for the at least one peak can be determined. For example, referring to FIG. 5, a first peak can exceed the threshold 510 by an amount $\Delta x_1$ 512, and a second peak can exceed the threshold 510 by an amount $\Delta x_2$ 514. The threshold 610 can be represented as a peak amplitude threshold $T_p$, above which, local peaks can occur at time indices $$\vec{n}_p = [n_{p,0} \, n_{p,1} \ldots n_{p,N_p-1}] \quad \text{EQ 6}$$

For each of the $N_p$ local peaks, above the threshold, the peak detector 212 (See FIG. 3) can compute the overshoot and form the vector $$\vec{\Delta x} = [\Delta x_0 \, \Delta x_1 \ldots \Delta x_{N-1}] \quad \text{EQ 7}$$

where $$\Delta x_n = \begin{cases} x_n - T_p L x_n & n \in \vec{n}_p \\ 0 & n \notin \vec{n}_p \end{cases} \quad \text{EQ 8}$$

At step 606, an angle and a magnitude for the peak overshoots in the peak overshoot vector of EQ 7 can be determined. For example, referring to FIG. 5, an angle and magnitude can be determined for the first peak overshoot $\Delta x_{n_p,1}$ 512 and the second peak overshoot $\Delta x_{n_p,2}$ 514. Notably, FIG. 5 is an illustration provided only for showing peak overshoot and detection. Embodiments of the invention are not limited to the illustration, and one skilled in the art can appreciate various deviations in the characteristics of the signal, peaks, and peak overshoots shown. At step 608, at least one symbol adjustment can be generated from the at least one peak overshoot. In practice, the peaks may not be on adjacent samples. Moreoever, the peak overshoots can be limited to local peaks, which correspond to the time instances of the actual peak, as opposed to all samples that exceeds the threshold. The symbol adjustment is in a direction that is opposite to the peak overshoot for reducing an energy of the peak. Accordingly, for each local peak and subcarrier, the angle of the symbol adjustment is modulated in the opposite direction of the corresponding peak as shown below:

$$\theta_{n_p,k} = \angle x_{n_p} + \pi - \frac{2\pi n_p k}{N}$$

for $$n_p = n_{p,0}, n_{p,1}, \ldots, n_{p,N_p-1}$$

$$k = 0, 1, \ldots, N-1.$$

For each local peak in the modulated waveform 500, the magnitude of the total, modulated symbol vector adjustment can be set equal to the magnitude of the overshoot. The magnitude of each peak-suppressing symbol vector adjustment can be distributed over the subcarriers, according to one or more assigned weights of the frequency-domain weight vector of EQ 2, according to:

$$A_{n_p,k} = W_k \cdot |\Delta x_{n_p}| \text{ for } n_p = n_{p,0}, n_{p,1}, \ldots, n_{p,N_p-1} \ k = 0, 1, \ldots, N-1 \quad \text{EQ 10}$$

Notably, EQ 10 reveals that a single peak overshoot $\Delta x_n$ generates an adjustment for each symbol of the frequency-domain symbol vector, X, of EQ 1. Consequently, for each subcarrier, the total symbol adjustment is the sum total of symbol adjustments for all of the local peaks $$\Delta X_k = \sum_{n_p=n_{p,0}}^{n_{p,N_p-1}} A_{n_p,k} e^{j\theta_{n_p,k}}$$

$$= -W_k \sum_{n_p=n_{p,0}}^{n_{p,N_p-1}} |\Delta x_{n_p}| e^{j \angle x_{n_p}} e^{j 2\pi n_p k/N}$$

$$= -W_k \sum_{n_p=n_{p,0}}^{n_{p,N_p-1}} \Delta x_{n_p} e^{-j 2\pi n_p k/N}$$

EQ 11

The entire set of subcarrier symbol adjustments can be represented by:

$$\Delta \vec{X} = [\Delta X_0 \Delta X_1 \ldots \Delta X_{N-1}] \quad \text{EQ 12}$$

At step 406, the symbol adjustments $\Delta \vec{X}$ specified by EQ 12 can be applied to the symbol vector, X of EQ 1, in accordance with an assigned weighting for reducing a peak power of the modulated waveform, $x_n$. For example, in OFDM-A, a non-zero value (weight) can be assigned to active, data-carrying subcarriers, and a different non-zero value (weight) to idle subcarriers. Idle subcarriers can carry data for other users within the OFDMA band. All out-of-band subcarriers can be assigned a weight of zero, or a small non-zero value, if desired. Accordingly, less distortion can be distributed into the idle subcarriers, compared to the used subcarriers, when forming the peak-suppressing signal; that is, the signal applied to the modulated waveform corresponding to the symbol adjustment. At step 421, the method 400 can end.

The method 400 can further include reserving at least one carrier for directing energy away from used subcarriers and directing the energy to one or more reserved carriers. In tone reservation, one or more OFDM subcarriers can be reserved for creating peak-suppressing signals. Distortion can be added to the reserved subcarriers without affecting system performance or signal quality since the reserved carriers are unused; that is, they are not carrying information. For a system such as 802.16e, one set of 48 subcarriers can be reserved, i.e., one subchannel, for peak-power reduction. The reserved carriers can be implemented with the peak limiting steps of the method 400 to produce a hybrid scheme that provides an efficient solution. The implementation includes forming the weighting vector W by assigning a higher non-zero value to the reserved subcarriers than the used subcarriers. Accordingly, energy e.g. (noise) generated from the one or more symbol adjustments can be injected into the reserved subcarriers for increasing the distortion level in reserved subcarriers in comparison to the other subcarriers.

Reserved carriers do not carry data and can be dispersed within the communication band for dumping energy. For example, spectral energy resulting from a symbol adjustment can be distributed to one or more reserved subcarriers instead of used subcarriers. Referring back to FIG. 3, in practice, the tone reservation unit 215 can reserve one or more subcarriers, and the processor 210 can control a distribution of energy to the reserved subcarriers. The distortion unit 212 can assign a higher weighting to the reserved subcarriers for distributing a higher proportion of energy to the reserved subcarriers than to the used subcarriers of the modulated waveform. Moreover, the distortion unit 212 can assign at least one weight to at least one in-band subcarrier that is not on a sub-channel of the digital communication signal. For example, the distortion unit 212 can introduce and control a first distortion in at least one idle subcarrier, and a second distortion in at least one reserved subcarrier. That is the tolerable distortion levels can be different based on a type of the subcarrier.

Distributing the energy to reserved subcarriers increases the distortion in reserved subcarriers relative to a distortion in the used subcarriers carrying the information signal. Notably, different predetermined weights can be assigned to data symbol subcarriers, pilot symbol subcarriers, idle subcarriers, out-of-band subcarriers, and reserved subcarriers. Accordingly, splatter can be injected into the idle and reserved subcarriers, in a controlled manner. Consequently, the peak limiting method 400 is capable of significantly reducing the PAPR, and, in turn, transmitting a higher average power, in an efficient manner. In certain cases of OFDMA, a 2 dB advantage, in transmit power, can be achieved using the peak-limiting method 400, while a 2.75 dB advantage can be achieved, using the peak-limiting method 400 with tone reservation, relative to the case of the unaltered OFDMA signal. Moreover, out-of-band emissions can be comparable for the two approaches while the transmitted C/N, and splatter into idle subcarriers, are held to tolerable levels.

Embodiments of the invention are also directed to efficiently calculating the symbol adjustments, $\Delta X$. Upon further examination of EQ 12, it can be noted that the entire set of subcarrier symbol adjustments $$\Delta \vec{X} = [\Delta X_0 \, \Delta X_1 \ldots \Delta X_{N-1}] \quad \text{EQ 13}$$

may be computed, efficiently, using the FFT $$\Delta \vec{X} = -W \bullet FFT(\Delta \vec{x}) \quad \text{EQ 14}$$

where • represents point-wise multiplication between vector elements. Referring back to FIG. 6, the threshold 600 reveals which method is more efficient. For a high threshold, there will be a small number of local peaks, so direct computation of the symbol adjustments using EQ 11 may be more efficient, whereas, if a low threshold is used, many local peaks may exist, resulting in a more efficient implementation using the FFT of EQ 12. The processor 210 (see FIG. 3) can determine whether the computational processing load associated with EQ 11 is greater or less than the computational load associated with EQ 12, and select the more efficient equation.

Figure 7:
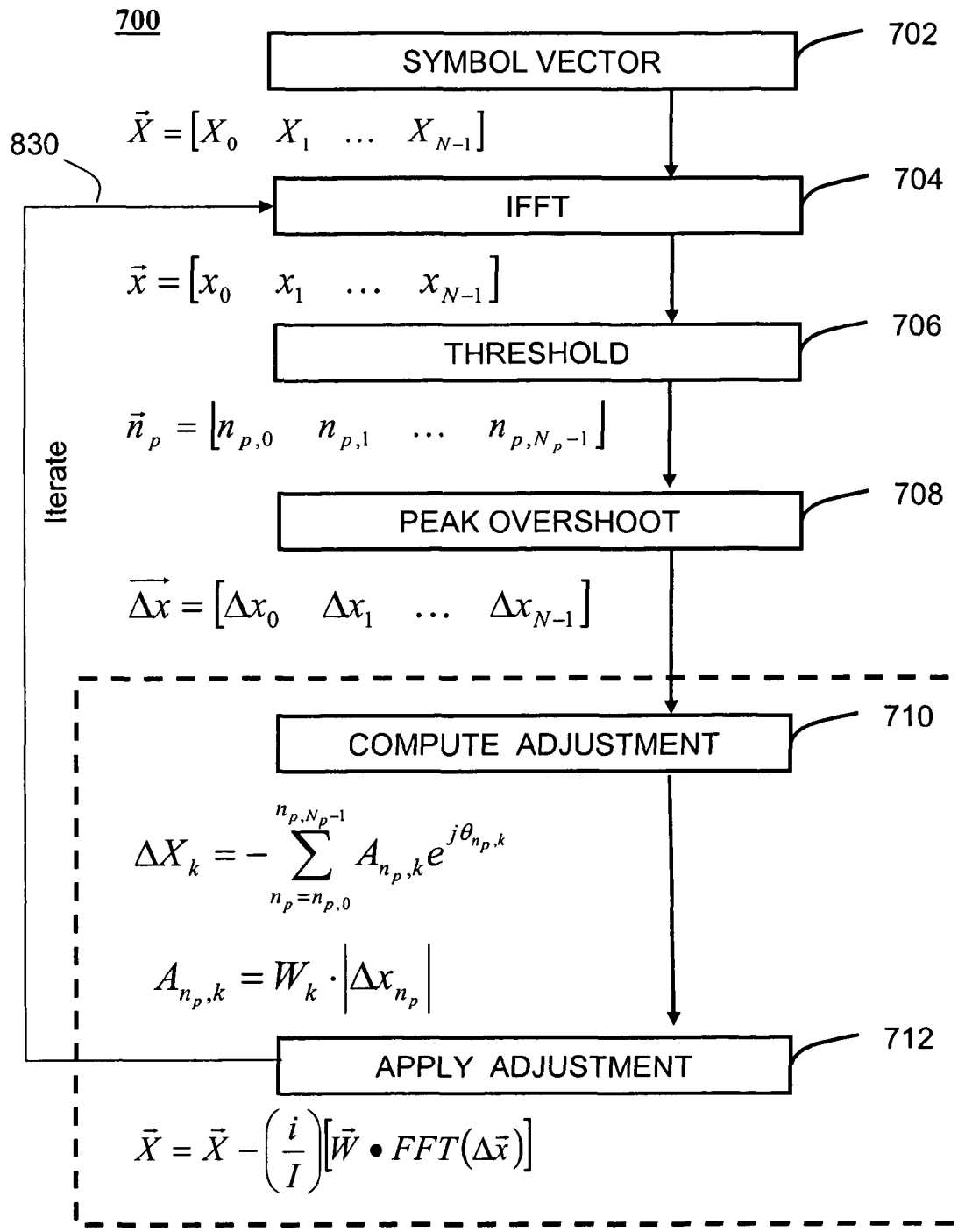
FIG. 7 is a block diagram for peak limiting in accordance with the embodiments of the invention.

Referring to FIG. 7, a block diagram 700 of the method 400 is shown to summarize the steps of the method and the equations. In particular, the block diagram 700 identifies the equations that correspond to the processing steps of method 400. At block 702, the symbol vector, X, representing the OFDM waveform of EQ 1 can be provided for processing. The OFDM symbol vector X can contain at least one symbol in at least one subcarrier of a mobile communication signal. At block 704, the OFDM symbol vector X can be modulated using an Inverse Fast Fourier Transform (IFFT) to produce a modulated waveform, $\vec{x}$. At block 706, at least one peak that exceeds a threshold, $T_p$, in the modulated waveform, $\vec{x}$, can be detected. At block 708, at least one peak overshoot, $\Delta x$ can be determined based on the peak of the modulated waveform. At block 710, a symbol adjustment vector $\Delta X$ for one or more symbols in the OFDM symbol vector can be determined based on one or more peak overshoots of the modulated waveform, $\vec{x}$. The symbol adjustments in the symbol adjustment vector $\Delta X$ can be applied across the one or more subcarriers of the modulated waveform, $\vec{x}$, in accordance with a weighting of the symbol adjustment vector. The weighting can inject a prespecified level of distortion in the at least one subcarrier. At block 712, the symbol adjustments $\Delta X$ can be applied to the symbol vector X for reducing a peak power of the modulated waveform, $\vec{x}$. For example, each symbol adjustment can be added to a corresponding symbol in the symbol vector, X. The method can continue in an iterative manner 830 until the updated symbol waveform X achieves a presepecified level of distortion in each of the subcarriers in accordance with the weighting, W. That is, the update symbol vector X can be re-modulated and the time-domain equivalent of X can be re-evaluated for any remaining peaks. Again, the peak overshoots can be re-evaluated and a symbol update can be applied to the updated symbol vector. The process can repeat in an iterative manner wherein, incremental updates are applied to the symbol vector for allowing a re-evaluation of peaks and for limiting peak power.

Figure 8:
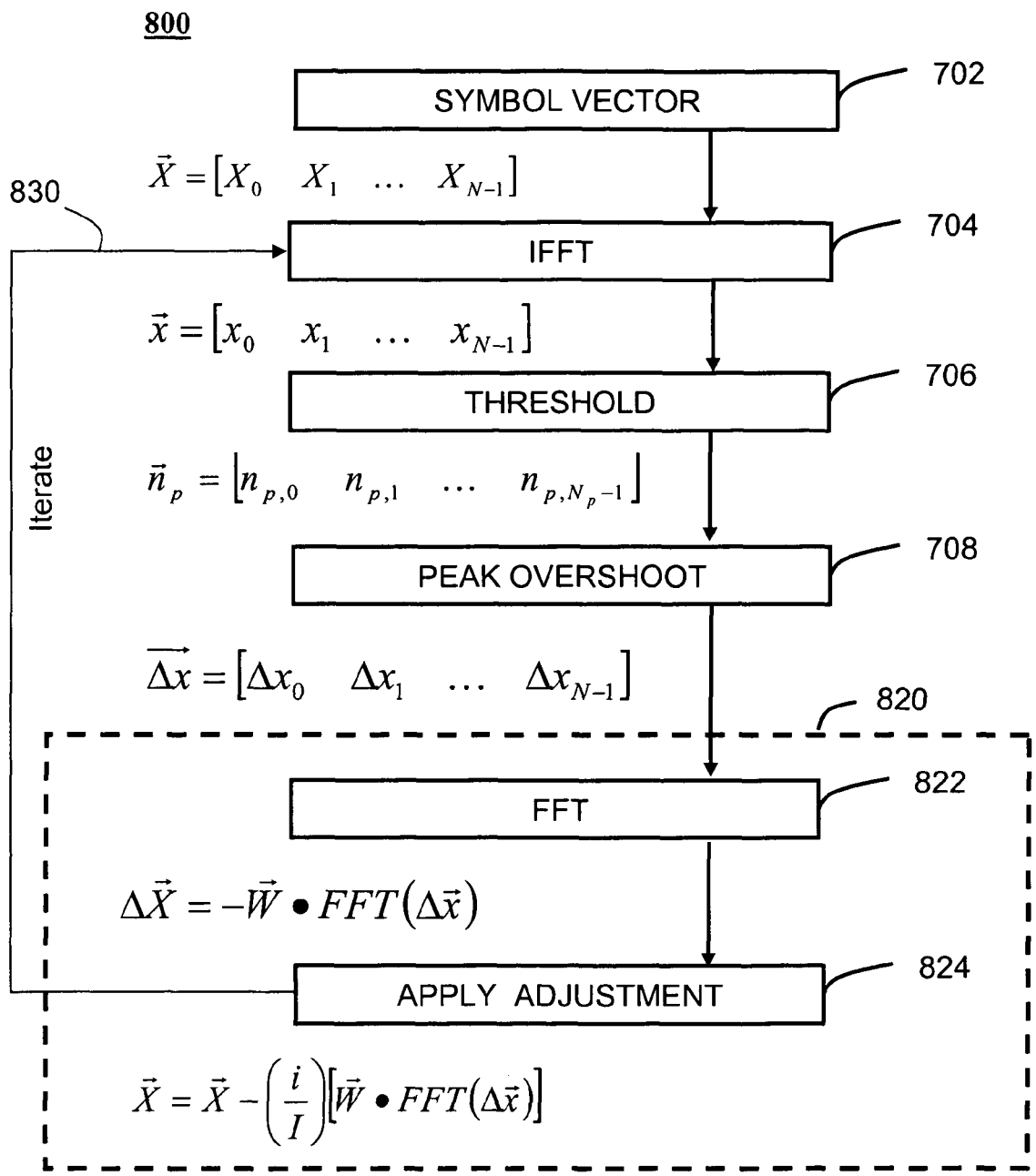
FIG. 8 is a block diagram for peak limiting using a Fast Fourier Transform in accordance with the embodiments of the invention.

Referring to FIG. 8, block diagram 800 for peak power reduction of the method 400 is shown. In particular, the block diagram 800 includes an FFT stage 820 for efficiently computing the symbol adjustment coefficients in accordance with EQ 14, as previously discussed. The block steps 702 to 708 of FIG. 8 are the same as FIG. 7, and are presented merely for illustration. At block step 822, an FFT can be performed on at least one peak overshoot, $\Delta \vec{x}$, of the modulated waveform, $\vec{x}$. The output of the FFT can be weighted by a predetermined weighting factor, $-W$ to produce a weighted FFT output, $\Delta X = -W \bullet FFT(\Delta \vec{x})$, corresponding to the symbol adjustments $\Delta X$. At block step 824, the symbol adjustments $\Delta X$ can be applied to the symbol vector X for reducing a peak power of the modulated waveform, $\vec{x}$.

It should be noted that the FFT stage 820, determines the total symbol adjustment. Notably, when the symbol adjustments $\Delta X$ are applied to the symbol vector, X for reducing a peak power of the modulated waveform, $\vec{x}$, the modulated waveform, $\vec{x}$, will change. That is, the symbol adjustments for each peak overshoot, when applied to the modulated waveform, may increase or decrease the magnitude of other peaks, or introduce new peaks in the modulated waveform. Recall, as described in EQ 10, the symbol updates are distributed across one or more subcarriers of the modulated waveform, $\vec{x}$. Consequently, the shape of the modulated waveform changes in response to the symbol adjustments. The symbol adjustments can be made in an incremental manner for determining changes in the modulated waveform. As shown in FIG. 8, the method 400 for peak limiting can be performed in an iterative manner as described in the discussion of FIG. 7.

That is, the symbol adjustments can be divided into smaller updates, or incremental symbol updates, for preventing a total cumulative adjustment that may introduce other unwanted peaks. The incremental adjustments can be applied to the modulated waveform to determine resulting changes in the modulated waveform, such as new peaks, or magnitude increases in existing peaks. New symbol adjustments based on the changes can be re-calculated in the iterative process. The iterative process allows for a re-examination of the modulated waveform in an ensuing iteration, to identify which peaks remain after symbol adjustments. Consequently, the incremental symbol adjustment can be applied to the modulated waveform for reducing the power of one or more peaks of the modulated waveform in an iterative and controlled manner. The update to the length-N symbol vector can be described by:

$$\vec{X}' = \vec{X} - \left(\frac{i}{I}\right)\left[\vec{W} \cdot FFT(\Delta \vec{x})\right] \quad \text{EQ 15}$$

where i is the iteration number, and I is the number of iterations. Note that small adjustments are made during the early iterations, and larger adjustments are made later during the iteration when the number of remaining peaks is small. The iterative process may or may not include the FFT, which depends on the number of peaks in the modulated waveform. For example the FFT of the modulated waveform can be replaced by EQ 11 when the number of peaks is below a certain number. Referring to FIG. 8, the symbol vector X can be remodulated and peak overshoots corresponding to the symbol update can again be re-evaluated. Accordingly, the incremental symbol updates are performed in an iterative manner 830 for evaluating the effects of the symbol update on the symbol vector.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for peak limiting suitable for use in a communication system, comprising:
   modulating a symbol vector to produce a modulated waveform, wherein the symbol vector contains at least one symbol in at least one subcarrier;
   computing at least one symbol adjustment that is based on at least one peak overshoot of the modulated waveform; and
   applying the at least one symbol adjustment to the symbol vector in accordance with an assigned weighting for reducing a peak power of the modulated waveform,
   wherein the applying is an iterative process that repeats the method steps of modulating, computing, and applying the at least one symbol adjustment for limiting a distortion energy in the at least one subcarrier to a prespecified level;
   assigning at least one weight to the at least one symbol adjustment, wherein the at least one weight corresponds to the prespecified level of distortion in the at least one subcarrier; and
   wherein different predetermined weights are assigned to data symbol subcarriers, pilot symbol subcarriers, idle subcarriers, out-of-band subcarriers, and reserved subcarriers.

2. The method of claim 1, wherein the applying distributes the at least one symbol adjustment across the at least one subcarrier in accordance with the prespecified level of distortion in the at least one subcarrier.

3. The method of claim 1, wherein the computing at least one symbol adjustment comprises:
   detecting at least one peak in the modulated waveform that exceeds a threshold;
   computing at least one peak overshoot for the at least one peak;
   determining an angle and a magnitude of the at least one peak overshoot; and
   generating the at least one symbol adjustment from the at least one peak overshoot,
   wherein the at least one symbol adjustment has an angle that is approximately a negative to the angle of the at least one peak overshoot and a magnitude that is approximately the same as the magnitude of the at least one peak overshoot.

4. The method of claim 1 wherein the computing and the applying the at least one symbol adjustment is an iterative process that comprises:
   calculating an incremental symbol update from the symbol adjustment; and
   applying the incremental symbol update to the at least one symbol of the symbol vector,
   wherein the calculating and applying increases a contribution of the incremental symbol update during the iterative process for providing small adjustments during early iterations and larger adjustments during later iterations.

5. The method of claim 4, further comprising:
   forming a time-domain peak overshoot vector, with zero values at time instances where peak overshoot does not occur, and non-zero, complex values at times where peak overshoot does occur, the complex values representing the magnitude of the overshoot, and angle of the corresponding modulated sample;
   performing a Fast Fourier Transform (FFT) of the time-domain peak overshoot vector
   weighting an output of the FFT by a predetermined weighting factor to produce a weighted FFT output;
   multiplying the weighted FFT output by an update factor that is proportional to an iteration number to produce a fractional symbol update; and
   iteratively subtracting the incremental update from the symbol vector,
   wherein the modulated waveform is generated by modulating the symbol vector with an Inverse Fast Fourier Transform (IFFT).

6. The method of claim 5, wherein the iterative process includes re-modulating symbol vector with each iteration by repeating the step of forming a time-domain peak overshoot vector, performing a Fast Fourier Transform, weighting an output of the FFT, multiplying the weighted FFT, and iteratively subtracting the incremental update for limiting a distortion energy in the at least one subcarrier to a prespecified level.

7. A system for peak power reduction, comprising:
   a processor for controlling a peak-to-average power ratio (PAPR) of a digital communication signal, wherein the digital communication signal is a modulated waveform containing at least one symbol in at least one subcarrier;
   a transmitter for transmitting the digital communication signal, wherein the processor distributes at least one symbol adjustment across the at least one subcarrier for introducing a prespecified level of distortion in the at least one subcarrier to control a signal level energy in the at least one subcarrier;
   a distortion unit for assigning at least one weight to the at least one symbol adjustment, wherein the at least one weight corresponds to the prespecified level of distortion in the at least one subcarrier; and
   wherein different predetermined weights are assigned to data symbol subcarriers, pilot symbol subcarriers, at least one idle subcarriers, out-of-band subcarriers, and at least one reserved subcarriers.

8. The system of claim 7, wherein the processor further comprises:
   a modulator for modulating a symbol vector to produce the modulated waveform, wherein the symbol vector contains at least one symbol corresponding to the at least one subcarrier;
   a peak detector for detecting at least one peak in the modulated waveform that exceeds a threshold, computing at least one peak overshoot for the at least one peak, and determining an angle and a magnitude of the at least one peak overshoot; and
   a symbol adjustor for generating the at least one symbol adjustment from the at least one peak overshoot, wherein the at least one symbol adjustment has an angle that is approximately a negative to the angle of the at least one peak overshoot and a magnitude that is approximately the magnitude of the at least one peak overshoot.

9. The system of claim 7, wherein the processor
applies the at least one symbol adjustment to the modulated waveform for reducing a power of the at least one peak;
determines a distortion of the at least one symbol in the symbol vector due to the symbol adjustment; and
limits the distortion in the at least one subcarrier based on at least one weight assigned to the at least one symbol adjustment.

10. The system of claim 7, wherein the processor distributes the symbol adjustment using an iterative process that includes:
calculating an incremental symbol update from the symbol adjustment; and
applying the incremental symbol update to the at least one symbol of the symbol vector,
wherein the calculating and applying increases a contribution of the incremental symbol update during the iterative process for providing small adjustments during early iterations and larger iterations during later iterations.

11. The system of claim 7, wherein the processor further comprises:
a tone reservation unit for reserving at least one subcarrier thereby providing the reserved subcarrier, wherein the processor controls a distribution of energy to the reserved subcarrier that is produced in response to the at least one symbol adjustment.

12. The system of claim 11, wherein the distortion unit assigns a higher weighting to the at least one reserved subcarrier for distributing a higher proportion of energy to the at least one reserved subcarrier than to the at least one subcarrier of the digital communication signal, thereby increasing a distortion in the at least one reserved subcarrier relative to a distortion in the at least one subcarrier.

13. The system of claim 11, wherein the distortion unit introduces and controls a first distortion in at least one idle subcarrier, and a second distortion in at least one reserved subcarrier.

14. A method for peak power reduction suitable for use in an OFDMA communication system, comprising:
modulating an OFDM symbol vector using an Inverse Fast Fourier Transform (IFFT) to produce a modulated waveform, wherein the OFDM symbol vector contains at least one symbol in at least one subcarrier of a digital communication signal;
computing at least one symbol adjustment based on at least one peak overshoot of the modulated waveform;
distributing the at least one symbol adjustment across the at least one subcarrier in accordance with at least one weighting applied to the symbol adjustment for introducing a prespecified level of distortion in the at least one subcarrier,
wherein the distributing is an iterative process that repeats the method steps of modulating, computing, and distributing the at least one symbol adjustment for limiting a distortion energy in the at least one subcarrier to a prespecified level;
applying the at least one symbol adjustment to the OFDM symbol vector in accordance with an assigned weighting for reducing a peak power of the modulated waveform; and
wherein different predetermined weights are assigned to data symbol subcarriers, pilot symbol subcarriers, idle subcarriers, out-of-band subcarriers, and reserved subcarriers.

15. The method of claim 14, further comprising:
iteratively controlling at least one distortion in the at least one subcarrier of the digital communication signal until a peak power is sufficiently reduced.

16. The method of claim 14, wherein the distributing the symbol adjustment is an iterative process that comprises:
calculating a fractional symbol update from the symbol adjustment; and
applying the fractional symbol update to the at least one symbol of the OFDM symbol vector,
wherein the calculating and applying increases a contribution of the fractional symbol update during the iterative process for providing small adjustments during early iterations and larger iterations during later iterations.

* * * * *